Dec. 30, 1958      A. S. CHARLAT      2,866,530
POWER-TRANSMITTING DEVICE
Original Filed March 18, 1954
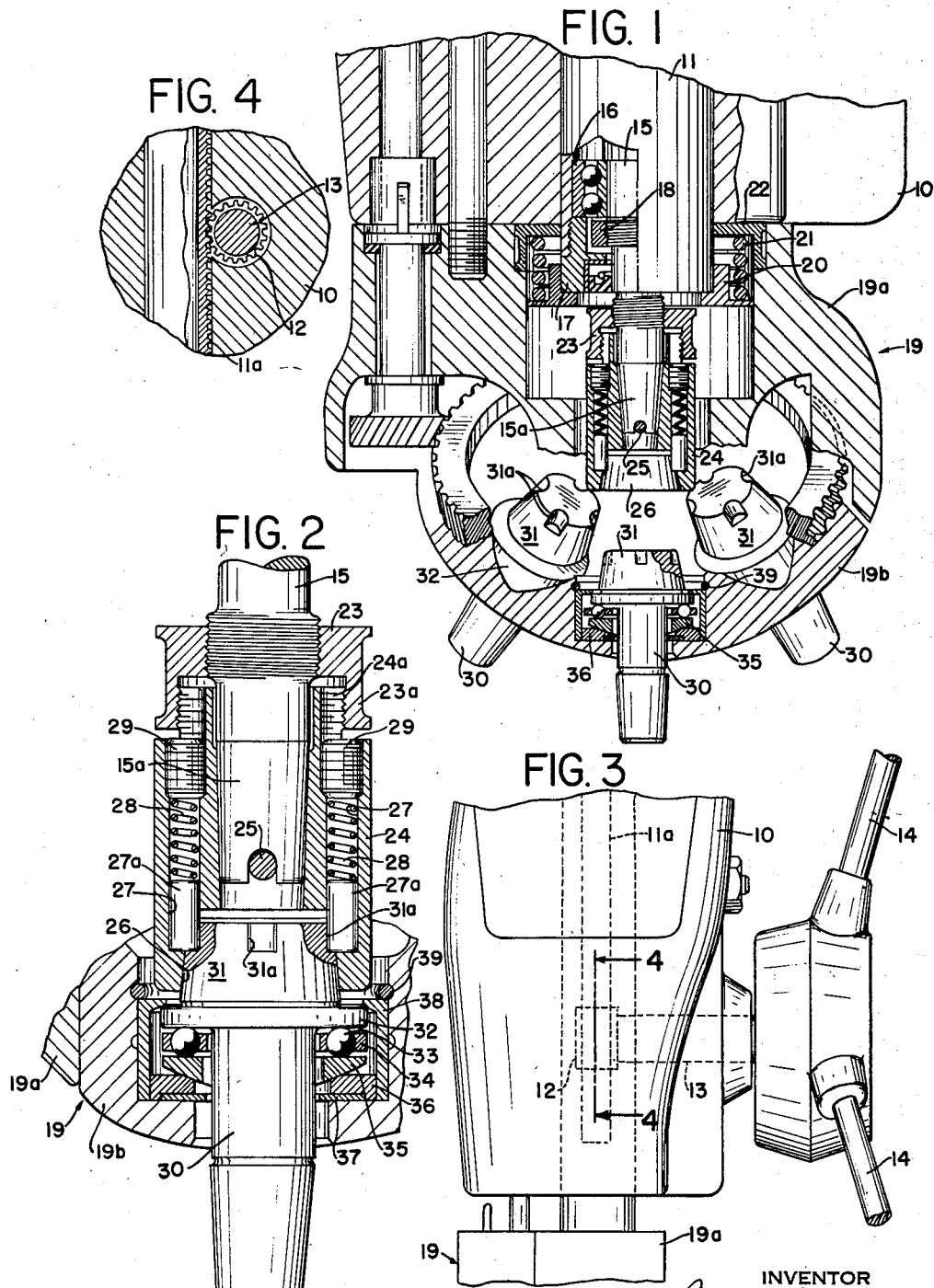
INVENTOR
Arnold S. Charlat
BY
ATTORNEYS United States Patent Office 2,866,530
Patented Dec. 30, 1958

2,866,530

POWER-TRANSMITTING DEVICE

Arnold S. Charlat, Norwalk, Conn., assignor to Howe & Fant, Inc., East Norwalk, Conn., a corporation of Delaware Original application March 18, 1954, Serial No. 417,103. Divided and this application October 4, 1956, Serial No. 613,932

3 Claims. (Cl. 192—67)

This invention relates to power-transmitting devices or clutches for connecting a pair of coaxial members, such as a driving shaft and a driven shaft, for rotation in unison. More particularly, the invention is concerned with a novel clutch, which can be quickly engaged and disengaged and functions to provide a connection initially maintained by friction but becoming positive in the event of slight relative angular movement between the members connected. The clutch of the invention may be employed for a wide variety of purposes and offers special advantages when used in a drilling machine of the turret type for connecting the machine spindle to the turret spindle, to which the tool to be put into use is attached. A form of the new clutch incorporated in the turret of the drilling machine disclosed in my co-pending application, Serial No. 417,103, filed March 18, 1954, of which this application is a division, will, accordingly, be illustrated and described in detail for purposes of explanation.

The new clutch includes a driver element and a driven element, one of which has a tapered axial recess formed with one or more bores lying parallel to its axis and opening through the inner surface of the recess. The second element has a tapered end section adapted to be received with a driving fit in the tapered recess of the first element and, in addition, has one or more axial openings extending inward through its tapered surface. Each of the bores contains a pin acted on by a spring and, normally, the end portion of the pin is exposed beyond the end of the bore. When the clutch is to be engaged, the elements are given a relative axial movement, which causes the tapered end section to enter the tapered recess. As this action occurs, the pins projecting out of the bores will ordinarily not enter the axial openings, so that, as the elements move together, the pins are forced back into their bores against the springs and the elements have a friction connection only. However, if the load applied to the clutch is such as to cause slippage in the frictional connection, such slippage will ultimately bring the pins into alignment with the axial openings, so that the pins will enter the openings and establish a positive connection between the elements.

For a better understanding of the invention, reference may be made to the accompanying drawing, in which Fig. 1 is a vertical sectional view with parts shown in elevation and other parts broken away of a turret drilling machine contained the new clutch, the clutch elements being disengaged;

Fig. 2 is a vertical sectional view showing the clutch of Fig. 1 with the elements engaged;

Fig. 3 is a fragmentary elevational view showing the means for operating the clutch; and Fig. 4 is a fragmentary sectional view on the line 4—4 of Fig. 3.

In the drawing, the clutch is shown in the drilling machine of my prior application and the machine includes a housing 10, in which a quill 11 is mounted for vertical movement. The quill is formed with rack teeth 11a meshing with a pinion 12 on a shaft 13, which is mounted for rotation in bearings in housing 10 and is rotatable by spokes 14 to raise and lower the quill.

A spindle 15 is mounted for rotation in upper and lower ball bearings in the quill, the lower bearing 16 only being shown. The inner and outer races of bearing 16 are seated at their upper ends against circumferential shoulders on the quill and spindle, respectively, and the lower end of the outer race is seated on the upper end of a bearing cap 17 threaded into the lower end of the quill. The inner race is held in place against the shoulder on the spindle by a lock nut 18 threaded on the spindle.

The quill projects below the lower end of housing 10 and enters a recess in the upper housing 19a of a turret 19. A lower collar 20 is telescoped over the lower end of the bearing cap 17 and is secured to cap 17 by any suitable means. The collar has a circumferential flange, upon which is seated a coil spring 21 encircling the quill. At its upper end, the spring bears against the radial flange of an upper collar 22, which lies in the upper end of the recess in housing 19a and is secured in place in the recess in any suitable way.

The spindle 15 projects below the lower end of the quill and a collar 23 is threaded on the projecting end of the spindle and has an axial flange spaced from the spindle and internally threaded. The spindle projects below the lower end of collar 23 and has a tapered end section 15a with a diametric groove in its free end.

A driver element 24 is mounted on the lower end of the spindle and it is formed with a neck 24a, which is threaded into the flange 23a of collar 23. The element has a tapered internal bore, which receives the tapered end section 15a of the spindle. A pin 25 extends across the bore in the driver element 24 in position to be received in the diametric groove in the lower end of the spindle. The driver element has a tapered axial recess 26 at its lower end and it is formed with one or more bores 27 lying parallel to the axis and extending downward from its upper end to open partially through the surface of the recess 26. Each bore contains a pin 27a, which is forced downwardly by a spring 28 bearing against the pin and held in place by a plug 29 threaded into the upper end of the bore. When a pin is seated against the lower end of its bore, a portion of the pin lies exposed within the recess.

A lower housing 19b is pivotally mounted on the upper housing 19a for rotation on an axis at an angle to the axis of spindle 15. The lower housing is provided with a plurality of recesses arranged in a circular series concentric with the axis of rotation of the housing and each recess contains a turret spindle 30. Each spindle has a head 31 projecting into the interior of the housing beyond its recess and formed with a tapered circumferential surface, so that the head may enter the recess 26 at the lower end of the driver element 24 with a driving fit.

The head 31 of each turret spindle is provided with openings 31a in its tapered surface in position to receive the pins 27 on the driver element when the head enters recess 26. Below its head 31, each turret spindle has a radial flange 32, the under surface of which rests upon a group of balls 33 in a spacing ring 34. The balls run upon the flat upper surface of a bearing ring 35, which has a lower surface of spheroidal contour resting upon a similar surface on a bearing ring 36 seated in part upon the bottom of the recess in the housing and in part upon a flat sealing ring 37 lying between the bearing ring 36 and the bottom of the recess. The inner edge of the sealing ring 37 lies close to the surface of the spindle 30 and the several parts of the bearing lie within a sleeve 38, which is seated upon the bottom of the recess and has an internal flange at its top overlying the flange 32 on spindle 30. The sleeve 38 is held in place by a snap ring 39 in an internal channel in the side wall of the recess.

In the use of the drilling machine, the quill is raised by rotation of shaft 13 and pinion 14, whenever a different tool in the housing 19b is to be brought into effective position. As the quill rises, the upper collar 22 engages the bottom surface of housing 10 and the upward movement of the quill thereafter causes the spring 21 to be compressed between the collars 20 and 22 and the driver element 26 to be separated from the head 31 on the spindle directly beneath it. When the driver element has been moved to the position shown in Fig. 1, the lower housing 19b is rotated to bring the turret spindle carrying the desired tool beneath the main driving spindle 15 and the connection between the driver element 26 and the turret spindle now in effective position is established by lowering the quill. In the downward movement of the quill, the driver element 26 telescopes over the tapered head 31 on the turret spindle beneath it and a driving fit between the driver element and the head of the turret spindle is established. Any misalignment of the turret spindle with relation to the driver element is corrected by reason of the mounting of the turret spindle on the bearing resting on the members 35 and 36 with engaging surfaces of spherical contour.

Ordinarily, when the elements of the clutch are engaged as described, the pins 27 will not enter the openings 31a in the turret spindle in effective position, so that there will be a frictional connection only between the clutch elements. However, if any slippage in the clutch occurs, the relative angular movement of the driver element and of the turret spindle will ultimately bring the pins 27 in alignment with the openings 31a and the pins will at once enter the openings, so that the clutch elements are held positively against relative angular movement.

In the form of the clutch illustrated, the driver element has been shown as of the female type and the end sections on the tool spindles as male in form, but it will be evident that the opposite arrangement could be used, if desired. Also, the pins could be mounted in bores in the tool spindles and the driver element could be formed with axial openings to receive the pins. The arrangement illustrated is preferred, since it is more difficult to make a female element with the desired accuracy than a male element and it is, therefore, advantageous to employ a driver element female in form, since only one such element is required. For similar reasons, it is preferable to form the openings in the heads of the turret spindles and provide the driver element with the spring-pressed pins.

I claim:

1. A clutch for connecting a driving member and a driven member, which comprises a pair of elements adapted to be mounted on the respective members, first element having an axial recess open toward the second and tapering in diameter inwardly and the second element having an end section tapering in diameter toward its free end, the end section being insertable into the recess to provide a frictional driving connection between the elements, first element having at least one bore lying parallel to and offset from its axis and opening through the wall of the recess, a spring-pressed pin in the bore normally projecting out of the bore into the recess, and the second element having at least one opening extending inward from the tapered surface of its end section and adapted to receive the pin when the end section is within the recess and the elements are in the proper angular relationship.

2. The clutch of claim 1, in which the element with the axial recess is mounted on the driving member and the element with the tapering end section is mounted on the driven member.

3. The combination of driving and driven shafts, a fixed bearing for one shaft, a seat of spherical curvature encircling the second shaft, a bearing for the second shaft movably mounted on the seat, a member mounted on the end of one shaft and having an axial recess formed with a circumferential surface increasing in diameter toward the open end of the recess, a member mounted on the end of the other shaft and having an end section with a circumferential surface decreasing in diameter toward the outer end of the section, the end section being insertable into the recess to provide a driving connection between the members, each member having at least one bore lying parallel to and offset from its axis and opening through said circumferential surface of the member, and a spring-pressed pin in the bore of one member adapted to be received in the bore of the other member to connect the members positively.

References Cited in the file of this patent

UNITED STATES PATENTS

| | | |
|---|---|---|
| 305,372 | Burdict | Sept. 16, 1884 |
| 1,092,211 | Grove | Apr. 7, 1914 |
| 1,248,583 | Will | Dec. 4, 1917 |
| 1,618,470 | Patterson | Feb. 22, 1927 |
| 2,070,154 | Carter | Feb. 9, 1937 |
| 2,097,922 | Hodgson | Nov. 2, 1937 |